(12) United States Patent
Luedeke

(10) Patent No.: US 12,133,605 B1
(45) Date of Patent: Nov. 5, 2024

(54) METAL-REINFORCED CURTAIN GLIDE

(71) Applicant: Textron Aviation Inc., Wichita, KS (US)

(72) Inventor: Bryan John Luedeke, Augusta, KS (US)

(73) Assignee: Textron Innovations Inc., Providence, RI (US)

( * ) Notice: Subject to any disclaimer, the term of this patent is extended or adjusted under 35 U.S.C. 154(b) by 63 days.

(21) Appl. No.: 18/312,131

(22) Filed: May 4, 2023

(51) Int. Cl.
*A47H 15/04* (2006.01)
*B64D 11/00* (2006.01)
*E06B 9/36* (2006.01)

(52) U.S. Cl.
CPC ......... *A47H 15/04* (2013.01); *B64D 11/0023* (2013.01); *E06B 9/362* (2013.01)

(58) Field of Classification Search
CPC ......... E06B 9/362; A47H 15/00; A47H 15/02; A47H 15/04; A47H 13/01; A47H 13/02; A47H 13/04; A47H 13/06; B64D 11/0023
See application file for complete search history.

(56) References Cited

U.S. PATENT DOCUMENTS

| | | | | |
|---|---|---|---|---|
| 259,531 A | * | 6/1882 | Grimm | A47H 15/04 16/95 DW |
| 289,299 A | * | 11/1883 | Montgomery, Jr. | A47H 15/04 16/87.4 W |
| 2,074,928 A | * | 3/1937 | Miller | A47H 15/04 248/262 |
| 2,083,931 A | * | 6/1937 | Viola | A47H 1/06 16/95 D |
| 2,645,833 A | * | 7/1953 | Wistedt | A47H 15/04 24/711.1 |
| 3,522,621 A | * | 8/1970 | Ford | A47H 13/14 16/87.4 R |
| 3,616,486 A | * | 11/1971 | Ford et al. | A47H 15/04 16/87.2 |
| 3,820,191 A | * | 6/1974 | Gay | A47H 15/04 24/363 |
| 4,282,630 A | * | 8/1981 | Toder | A47H 15/04 206/343 |
| 4,299,008 A | * | 11/1981 | Burns | A47H 1/06 16/95 D |
| 4,584,737 A | * | 4/1986 | Ohman | A47H 15/04 16/93 D |
| 4,846,249 A | * | 7/1989 | Cooper | A47H 15/02 16/93 D |
| 5,421,059 A | * | 6/1995 | Leffers, Jr. | F21V 33/0012 362/253 |

(Continued)

FOREIGN PATENT DOCUMENTS

| | | | | |
|---|---|---|---|---|
| DE | 10212030 A1 | * | 10/2003 | A47H 13/00 |
| GB | 2472387 A | * | 2/2011 | A47H 15/02 |

*Primary Examiner* — Jeffrey O'Brien
(74) *Attorney, Agent, or Firm* — AVEK IP, LLC

(57) ABSTRACT

A metal curtain glide includes a spherical metal core coupled to a cable and having a polymer cup formed to fit a base of the metal core. The polymer cup includes a central opening for the cable to extend therethrough. An eyelet having a circular member with a connecting member is coupled to an end of the cable. A first member of a fastener assembly is coupled to the eyelet and configured to be removably secured to a second member of the fastener assembly that is coupled to a curtain. The curtain glide remains functional if the polymer cup fails.

18 Claims, 7 Drawing Sheets

(56) References Cited

U.S. PATENT DOCUMENTS

| | | | | |
|---|---|---|---|---|
| 5,547,156 A * | 8/1996 | Djuric | ...................... | A47H 1/04 16/93 D |
| 5,960,967 A * | 10/1999 | Neil | ...................... | A47H 1/144 211/94.01 |
| 6,000,456 A * | 12/1999 | Neverett | ................. | E06B 9/362 160/177 V |
| 6,098,246 A * | 8/2000 | Moir | ...................... | E06B 9/367 160/173 V |
| 6,098,699 A * | 8/2000 | Junius | .................... | A47H 15/04 160/330 |
| 6,334,477 B1 * | 1/2002 | Moir | ...................... | E06B 9/264 160/168.1 V |
| 6,808,150 B1 * | 10/2004 | Roetenberg | ............. | B25H 3/04 248/339 |
| 6,925,681 B2 * | 8/2005 | Lin | ........................ | B60J 1/2011 16/87 R |
| 7,653,966 B2 * | 2/2010 | Quinn | ................ | E05D 15/0647 16/93 R |
| 8,151,385 B2 * | 4/2012 | Goskowski | ............. | A47K 3/38 160/124 |
| 8,307,499 B2 * | 11/2012 | Ruffo | .................... | A47H 13/00 160/178.1 V |
| 8,533,910 B2 * | 9/2013 | Bennett | ................. | A47H 1/144 16/87.8 |
| 9,856,695 B2 * | 1/2018 | Leadens, II | ........ | B64D 11/0023 |
| 10,264,908 B2 * | 4/2019 | Hatton | .................... | A47H 15/04 |
| 10,806,288 B2 * | 10/2020 | Schöpfer | ................ | A47H 15/02 |
| 10,952,558 B2 * | 3/2021 | Choi | ........................ | A47H 1/04 |
| 11,187,020 B2 * | 11/2021 | Andersson | .......... | E05D 15/0647 |
| 11,191,383 B1 * | 12/2021 | Hatton | .................... | A47H 1/04 |
| 11,297,966 B2 * | 4/2022 | Alonso | .................... | A47H 15/02 |
| 11,399,650 B2 * | 8/2022 | Ko | ........................... | A47H 1/06 |
| 11,547,233 B2 * | 1/2023 | Shepherd | ............... | A47H 13/04 |
| 2008/0148526 A1 * | 6/2008 | Garcia | ................... | A47H 13/02 16/87 R |
| 2009/0119830 A1 * | 5/2009 | Goskowski | .............. | A47K 3/38 4/610 |
| 2010/0139037 A1 * | 6/2010 | Hufen | .................. | E05D 15/063 16/88 |
| 2011/0000630 A1 * | 1/2011 | Huang | ................... | A47H 15/04 160/383 |
| 2012/0018106 A1 * | 1/2012 | Robledo | .................. | A47H 1/04 160/330 |
| 2013/0167326 A1 * | 7/2013 | Rowan | ................... | A47H 15/02 16/94 D |
| 2017/0172332 A1 * | 6/2017 | Legault | .................. | A47H 1/18 |
| 2017/0208981 A1 * | 7/2017 | Nir | ............................. | A47H 1/04 |
| 2022/0015564 A1 * | 1/2022 | Olsen | ..................... | A47H 13/04 |
| 2024/0108160 A1 * | 4/2024 | Rupnow | ................ | A47H 13/04 |
| 2024/0188746 A1 * | 6/2024 | Hou | ...................... | A47H 5/0325 |

* cited by examiner

METAL-REINFORCED CURTAIN GLIDE

BACKGROUND

1. Field

Embodiments of the invention relate generally to drapery, and more specifically to glides used to move drapery in an aircraft environment.

2. Related Art

Various solutions have been proposed for compact, durable curtain glides. For example, U.S. Pat. No. 4,846,249 to Cooper et al. describes a window shade carrier and carrier assembly that includes a smooth plastic or metal sleeve to reduce friction between the carrier and the rail. U.S. Pat. No. 9,856,695 to Leadens II et al. describes a magnetic slider assembly for hanging partitions in an aircraft, including a magnetic slider assembly and a metal rail that contains the slider element. The magnetic slider assembly includes a head portion with a semi-spherical design. U.S. Pat. No. 8,151,385 to Goskowski et al. describes a glide that includes a plastic or polymer top ball with a vertical shaft that protrudes downward from the head and a rail comprised of an inverted U-shaped member that incorporates inward projecting lips to contain the glide. U.S. Pat. No. 3,522,621 to Ford et al. describes a carrier that uses a truncated spherical design such that the carrier can rotate 360 degrees within a traverse rod making it non-directional and the use of a synthetic organic plastic material that possesses inherent lubrication qualities. U.S. Pat. No. 5,421,059 to Leffers, Jr. describes a hemispherical slide used to attach curtains into a rail system. This invention uses non-directional attachments with a protrusion for attaching the curtain to a carrier.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In one embodiment, a curtain glide is configured to be removably coupled to a curtain and to slide within a track having a longitudinally extending bore. The curtain glide includes a spherical metal core coupled to a cable. A polymer cup is formed to fit a base of the spherical metal core, and the polymer cup has a central opening for the cable to extend therethrough. An eyelet includes a circular member with a connecting member extending therefrom. The connecting member is coupled to an end of the cable. A first member of a fastener assembly is coupled to the eyelet, and the first member is configured to be removably secured to a second member of the fastener assembly that is coupled to a curtain. The curtain glide remains functional if the polymer cup fails.

In another embodiment a metal curtain gliding system is configured to be removably coupled to a curtain. A track includes a longitudinally extending bore defined by two parallel walls. Each wall includes an inward extending flange defining a slot therebetween. A plurality of curtain glides is configured to slide within the longitudinally extending bore. Each curtain glide includes a spherical metal-reinforced polymer cup having a diameter greater than the slot and a linkage extending from the metal reinforced polymer cup. The linkage is configured to project through the slot in the metal track when the metal reinforced polymer cup slides within the longitudinally extending bore. An eyelet is secured to an end of the linkage.

BRIEF DESCRIPTION OF THE DRAWING FIGURES

Embodiments of the invention are described in detail below with reference to the attached drawing figures, wherein.

Figure 1:
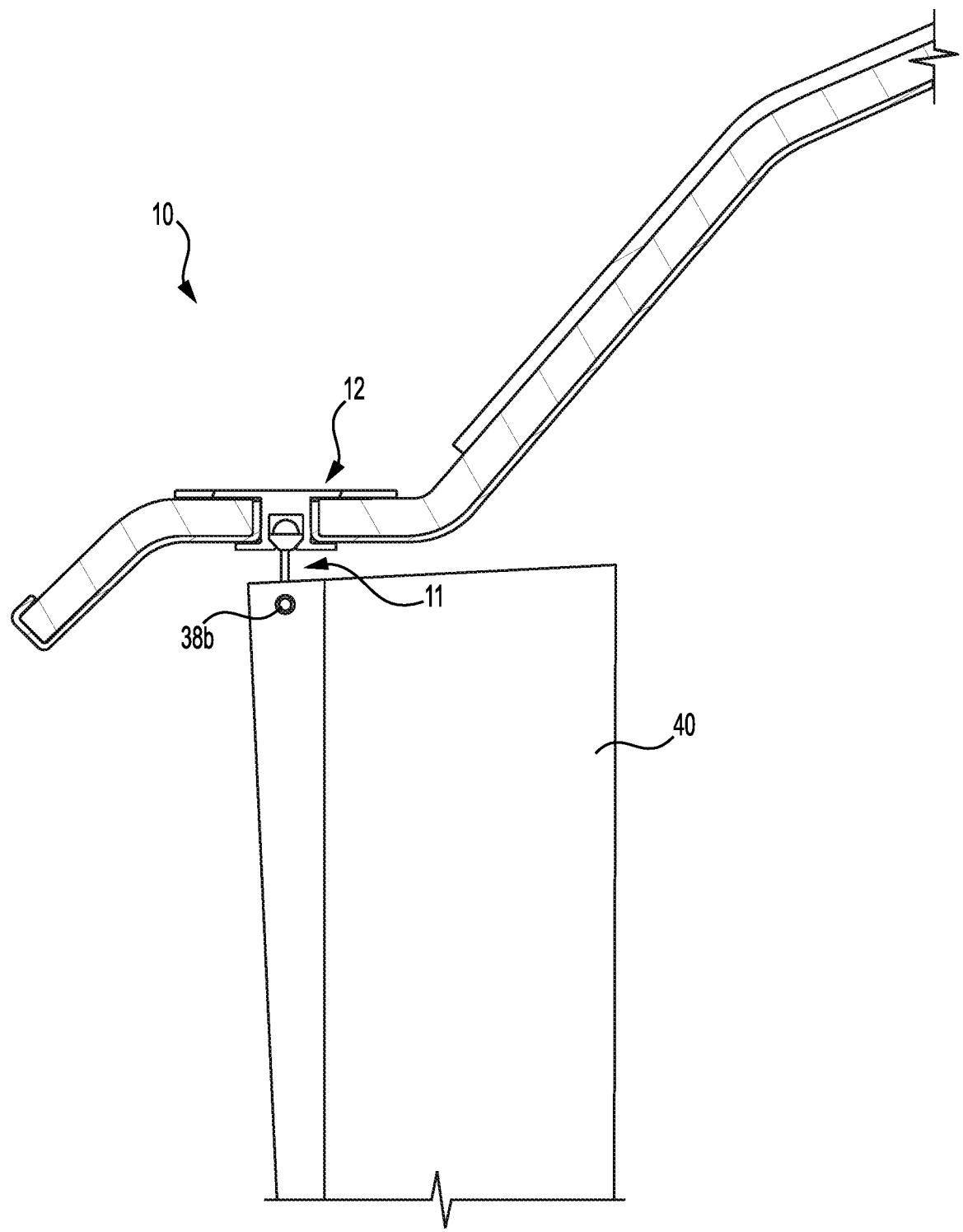
FIG. 1 is a side view of a metal-reinforced curtain gliding system installed with a curtain hanging therefrom, the system including a curtain glide and a metal track, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Figure 8:
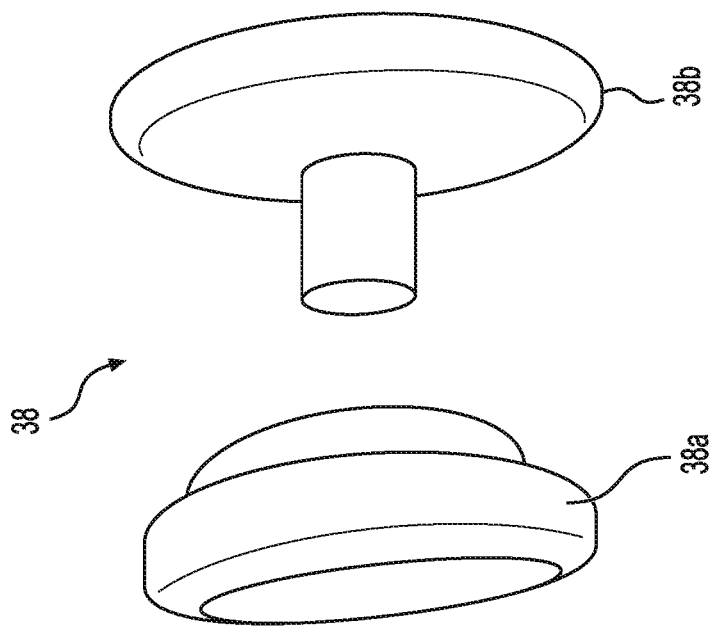
FIG. 8 is a perspective view of the female side of the snap assembly shown in FIG. 1 and which is removably securable to the male side of the snap assembly shown in FIG. 7, in an embodiment.
Figure 7:
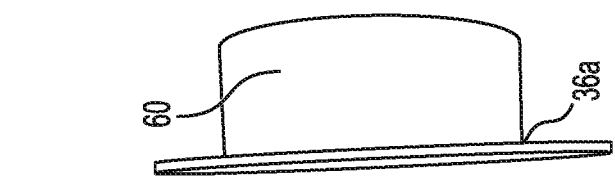
FIG. 7 is a perspective view of the male side of the snap assembly shown in FIG. 2, removed from the curtain glide, in an embodiment.
Figure 7:
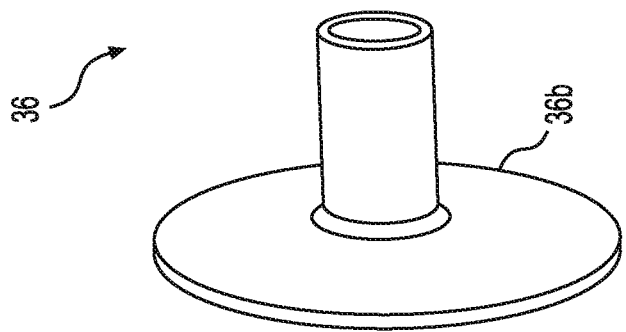

Embodiments disclosed herein describe a compact, non-directional, metal-reinforced curtain gliding system 10 that combines the durability of metal with the smooth, quiet operation of a polymer coating. As shown in FIGS. 1-4, in one embodiment the curtain gliding system 10 includes a curtain glide 11 and a hard coat anodized metal track 12 through which the curtain glide 11 slides or glides along a longitudinal axis thereof. The curtain glide 11 includes a metal ball or metal core 13 coupled to a first end 14 of a stainless-steel linkage or cable 16, a polymer cup 18 that is fitted around a base 20 of the metal ball 13 and that has a central opening 22 through which the cable 16 protrudes, and an eyelet 24. The metal ball 13 is sized to fit within the metal track 12 and the metal track 12 includes a slot 30 through which the cable 16 projects, allowing the metal ball 13 to slide or glide within the track 12. The curtain gliding system 10 may further include a fastener or snap assembly, shown in FIGS. 7 and 8, with a first member or male side 36 that includes a stud portion 36a and a post portion 36b coupled to the eyelet 24 and a second member or female side 38 that includes a socket portion 38a and a cap portion 38b coupled to a curtain 40. Alternatively, a hook or other connecting member may be used instead of the snap assembly to couple the eyelet 24 to the curtain 40. The first member 36 and the second member 38 are configured to be removably joined to each other. In the embodiment disclosed, "non-directional" is used to denote that the curtain glide 11 is able to slide along the longitudinal axis of the metal track 12, with each metal core 13 independently rotating within the metal track 12 about the vertical axis of its respective cable 16.

Figure 2:
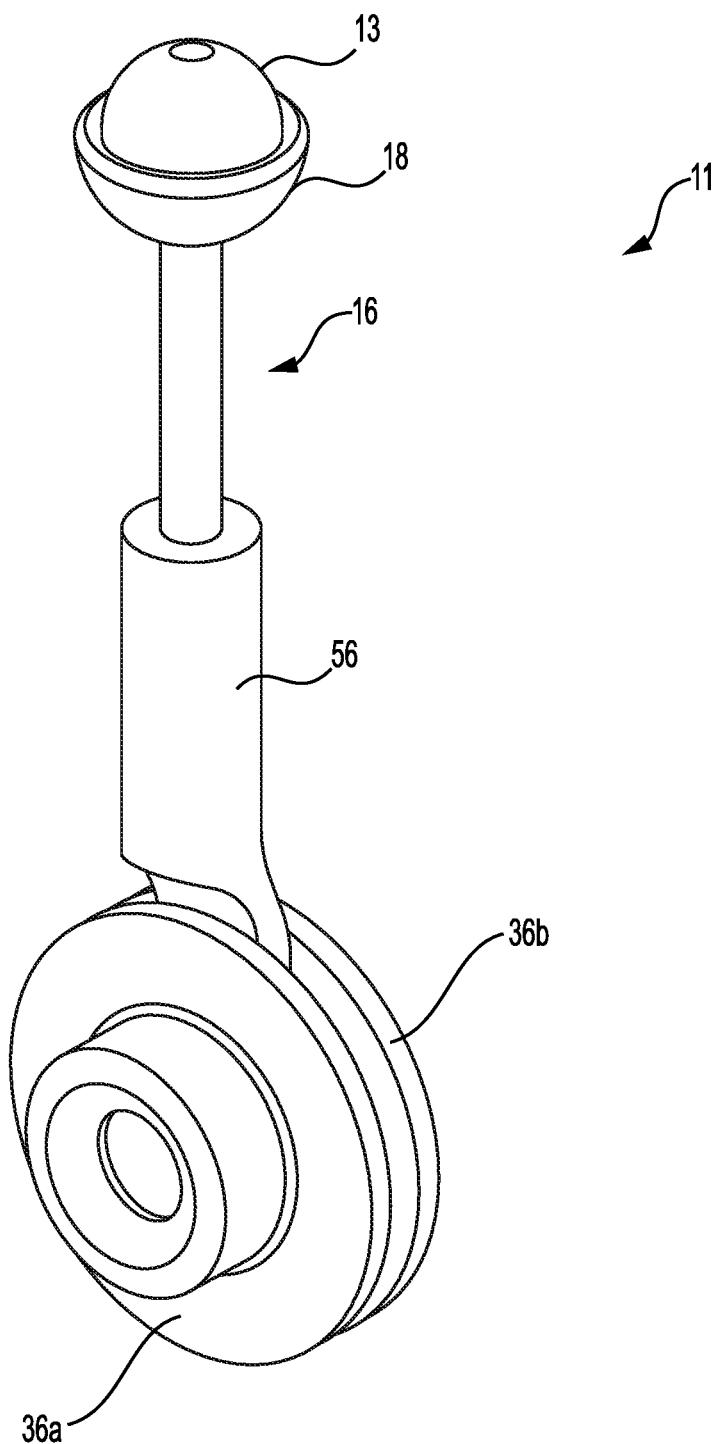
FIG. 2 is a perspective view of the curtain glide in FIG. 1, the curtain glide removed from the metal track and the curtain, in an embodiment.
Figure 3:
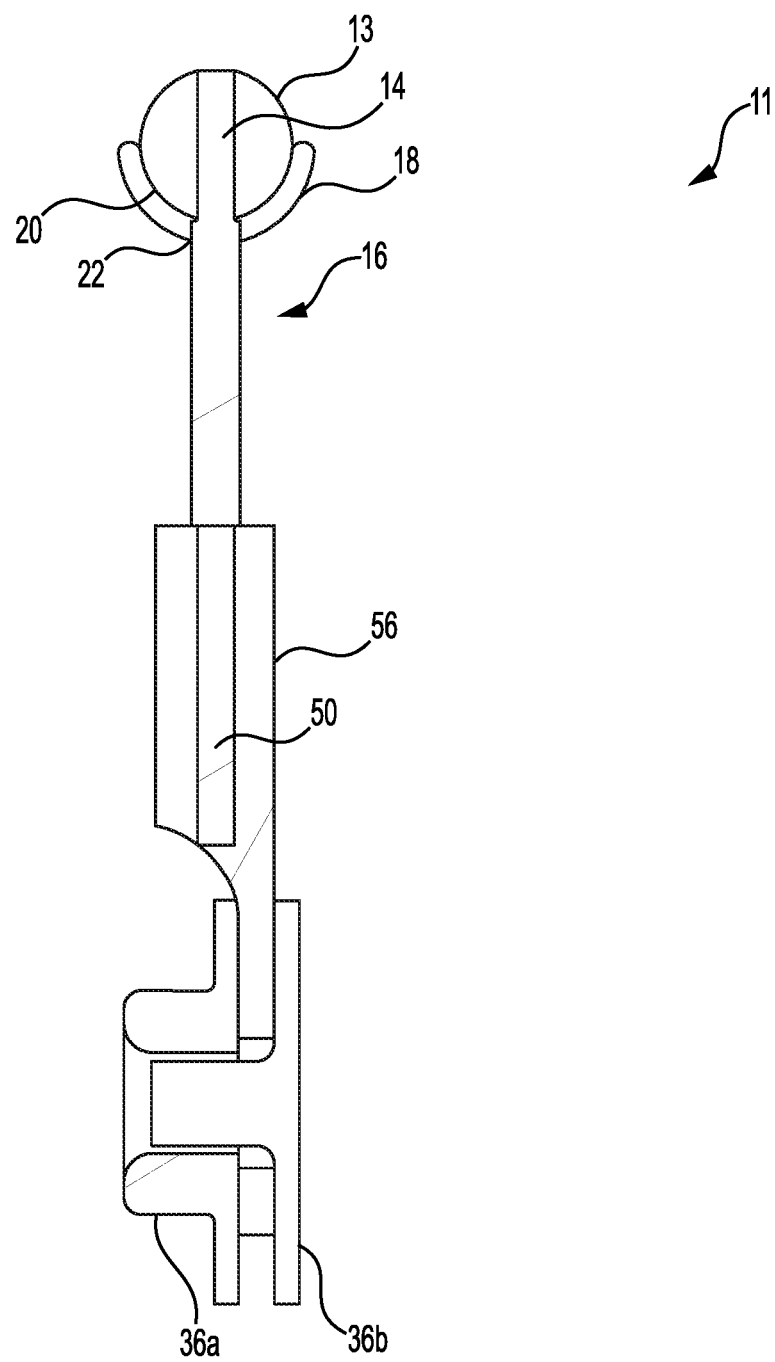
FIG. 3 is a cross-sectional view of the curtain glide in FIG. 2, in an embodiment.
Figure 4:
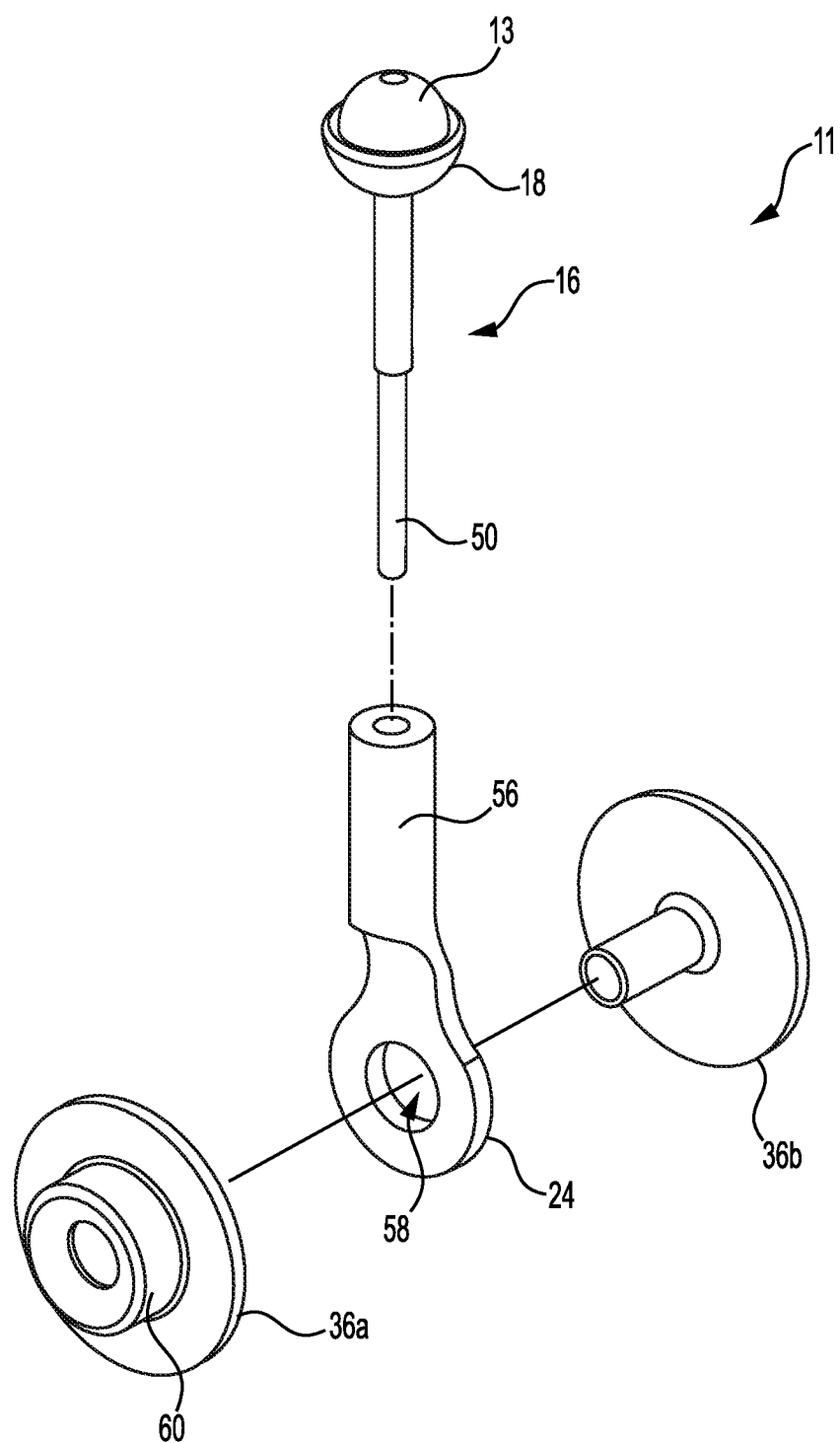
FIG. 4 is an exploded view of the curtain glide in FIG. 2, in an embodiment.

The curtain gliding system 10 includes the non-directional curtain glide 11, shown in FIGS. 2-4, that includes the metal core 13, the polymer cup 18 fitted to and reinforced by the metal core 13, and the cable 16 secured to the metal core 13, the cable 16 having the first end 14 and a second end 50 (see FIG. 3). In a preferred embodiment the metal core 13 is a sphere. The spherical shape of the metal core 13 permits the curtain glide 11 to slide along the longitudinal axis of the metal track 12 and permits each curtain glide 11 to swivel independently about a vertical axis of the respective cable 16 of each curtain glide 11 with respect to the metal track 12 in which curtain glide 11 is positioned, for example when the curtain 40 coupled to curtain glide 11 is moved or shifted during normal operation thereof.

In one embodiment the metal core 13 is a stainless-steel metal ball that is swaged or crimped onto the first end 14 of a nylon-coated stainless-steel cable 16. In one embodiment the metallic components include a 0.19-inch diameter stainless steel ball 13 swaged onto the first end 14 of a 3/64-inch diameter, nylon coated stainless steel cable 16. The metal core 13 and the cable 16 may each be one of a range of sizes. In one embodiment, the metal core 13 and/or cable 16 may be formed from another durable metal or non-metal material. In one embodiment, the metal core 13 may be formed into an alternate shape which is non-directional and able to slide and rotate on the metal track 12, alternate shapes including a hemisphere, a spheroid or an elongated sphere. In one embodiment, the metal core 13 and the cable 16 may be a single unitary body.

The polymer cup 18 is configured to receive the metal core 13. In one embodiment, the polymer cup 18 is formed into a portion of a hollow sphere configured to receive the metal ball 13, allowing the metal core or metal ball 13 to reside or nest inside of the polymer cup 18, preferably creating a friction fit or interference fit therebetween to secure the metal core 13 within the polymer cup 18 and to prevent polymer cup 18 from slipping or moving. The polymer cup 18 includes the opening 22 in a base or in approximately a center of the polymer cup 18 through which the cable 16 protrudes when the metal core 13 is seated in the polymer cup 18. The opening 22 has a diameter of approximately the same size or just larger than the diameter of the cable 16. The polymer cup 18 fitted onto the base of the metal core 13 covers the contact points or wear surface interface between the curtain glide 11 and the metal track 12 and is configured to provide a wear-resistant surface at the wear surface interface between the curtain glide and the track. The wear surface interface will be understood by one skilled in the art to be the surfaces of the curtain glide 11 and the metal track 12 in frictional contact when the curtain glide 11 is positioned in the metal track 12 and during operation of the curtain gliding system 10.

The polymer cup 18 is fitted around or coupled to the metal core 13, and preferably around the base 20 of the metal core 13, with the cable 16 that protrudes from the metal core 13 protruding from the opening 22 in the polymer cup 18. The polymer cup 18 may be installed onto the metal core 13 by inserting the second end 50 of the cable 16 into the opening 22 on a concave side of the polymer cup 18, sliding the formed polymer cup 18 onto the second end 50 of the cable 16 and advancing the polymer cup 18 toward the first end 14 of the cable 16 and into fitting relationship with the metal core 13.

The polymer cup 18 is formed from a material that minimizes friction between the curtain glide 11 and the metal track 12. The polymer cup 18 is preferably formed from a material designed to be highly durable with respect to the wear surface interface between the polymer cup 18 and the metal track 12 such that breakage of the curtain glide 11 is reduced as compared to plastic curtain glides or directional t-shaped gliders formed from plastic, but quiet operation is maintained. In one embodiment the polymer cup 18 may be formed or manufactured by printing, overmolding or building the polymer cup 18 using techniques or processes that would be known to a person skilled in the art. Preferably, the polymer cup 18 is formed from a polymer or another low friction material that reduces the friction between the polymer cup 18 and the metal track 12 and facilitates relative movement of the metal core 13 with the polymer cup 18 with respect to the metal track 12. In one embodiment the polymer cup 18 is formed from a self-lubricating plastic, the lubrication being an integral component of the bearing material.

In one embodiment the polymer cup 18 is manufactured using a digital model employing selective laser sintering (SLS). The SLS polymer cup 18 is 3D-printed from a plastic polymer material and results in a wear resistant polymer cup 18 that is able to slide onto the cable 16 and is fitted to the metal core 13. One example of the polymer cup 18 is produced by German company, IGUS, using their proprietary material iglide® I3-PL, an SLS powder, via an SLS process. The SLS process permits the polymer cup 18 to be printed to exacting specifications while the proprietary material provides abrasion resistance three times greater than conventional materials for SLS.

In one embodiment the cable 16 is a stainless-steel cable with a nylon coating. It is foreseeable that an alternate material may be used for the linkage or cable 16 that optimally has properties of being durable and flexible. Importantly, the cable 16 is made of a durable material (e.g., stainless-steel) enabling the cable to withstand the weight of the curtain 40 as well as frequent movement of the curtain 40 during its use, and to withstand aircraft motion imparted to the system. The cable 16 extends from the metal core 13 and extends through the slot 30 in the metal track 12, the cable 16, along with the weight or load of the curtain 40, maintaining the curtain glide 11 in a substantially upright or vertical position with the metal core 13 positioned approximately above the cable 16.

The eyelet 24 may be secured to the second end 50 of the cable 16 by crimping, swaging, or by another means, to allow the curtain glide 11 to be fixed to the curtain 40. As best shown in FIG. 4, the eyelet 24 is a circular member with a connecting member 56 extending from a periphery or one side of the eyelet 24 toward the metal ball 13. The second end 50 of the cable 16 is swaged to the connecting member 56 extending from the eyelet 24. The eyelet 24 includes a center recess or opening 58 configured to receive the first member 36 of the snap assembly. Alternately, the eyelet 24 may be integral with a member of the snap assembly.

Figure 6:
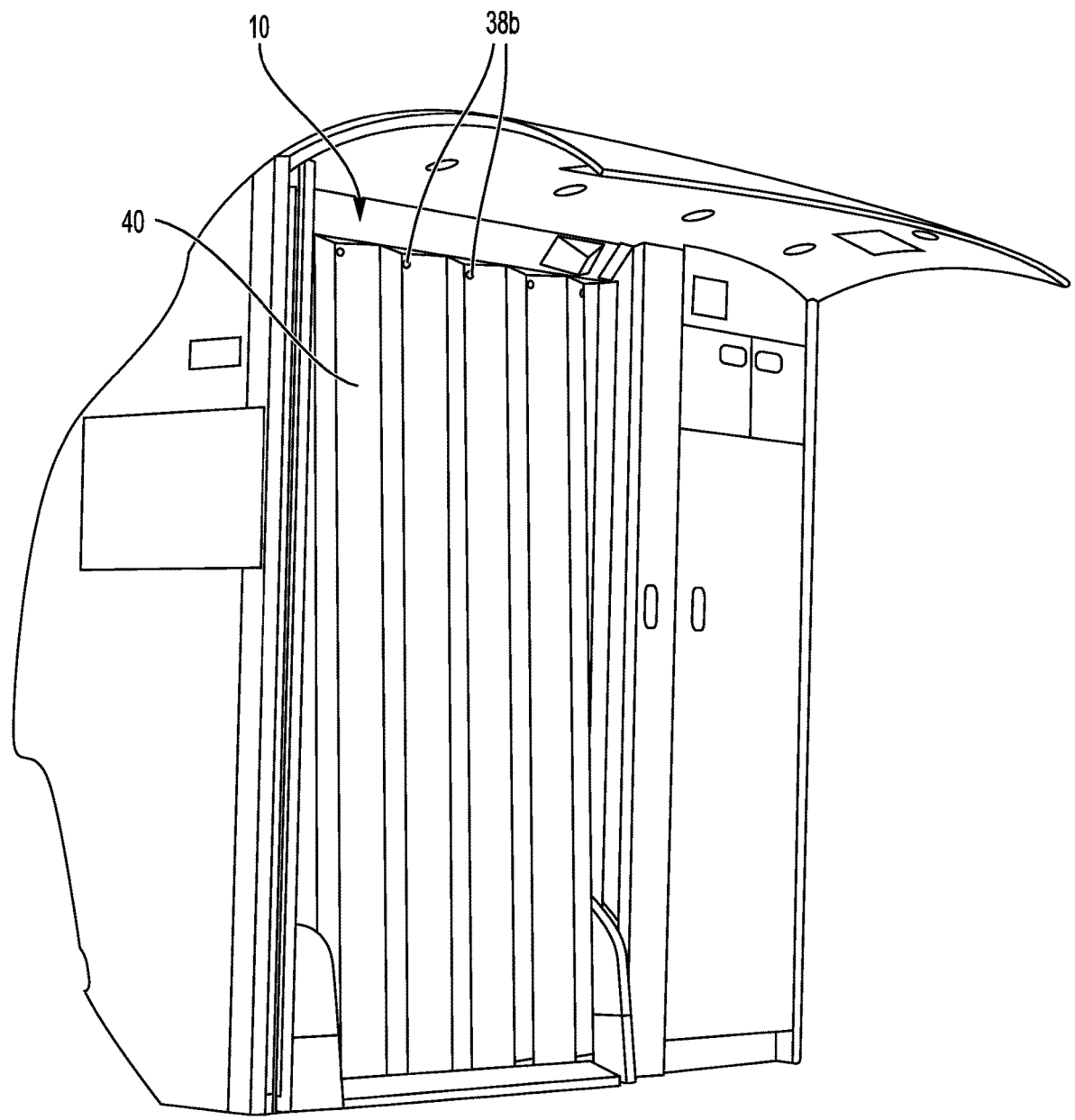
FIG. 6 is a perspective view of the metal-reinforced curtain gliding system installed with the curtain hanging therefrom as shown in FIG. 1, shown in a context of an aircraft interior, in an embodiment.

In one embodiment, the stud portion 36a of the snap assembly is secured or crimped to the post portion 36b, with the eyelet 24 secured therebetween and, as shown in FIG. 6, the socket portion 38a of the snap assembly is secured or crimped to the cap portion 38b, with the curtain 40 secured therebetween. The first member 36 may be removably securable to the second member 38 to secure the curtain glide 11 to the curtain 40. It is foreseen that the first member 36 of the snap assembly could be crimped onto the curtain 40 and the second member 38 of the snap assembly could be crimped onto the eyelet 24. Further, alternate coupling assemblies or connectors could be used to removably secure the curtain glide 11 to the curtain 40.

In case of failure of an individual curtain glide 11, each curtain glide 11 may be individually removed and replaced by unsecuring or unsnapping the first member 36 from the second member 38 of the snap assembly, removing the curtain glide 11 from the metal track 12 by sliding it off the metal track 12, replacing the old curtain glide 11 with a new curtain glide 11, installing or sliding the new curtain glide 11 onto the metal track 12 and securing or snapping the first member 36 of the snap assembly of the new curtain glide 11 to the second member 38 of the snap assembly on the curtain 40.

The snap assembly, known to a person in the art, includes the first member 36 and the second member 38, securable to one another for securing the curtain glide 11 to the curtain 40. The stud portion 36a of the first member 36 may be a disc having a groove or protrusion 60 that removably interlocks with a lip on the socket portion 38a of the second member 38 configured to receive the protrusion. In one embodiment, the first member 36 is removably fastened to the second member 38 by applying pressure such that the protrusion 60 is pressed into the socket portion 38a. The snap assembly may be formed from any number of materials, including metal, plastic or a combination thereof.

The metal track 12 of the curtain gliding system 10 may include a coating that provides or improves corrosion resistance, durability, and decreased friction. In a preferred embodiment the metal forming the metal track 12 is a hard coat anodized metal (e.g., aluminum or aluminum alloy). In embodiments, a painted finish is applied to the metal track 12. The curtain glide 11 is able to slide on the hard coat anodized metal track 12 with minimum effort and without producing significant wear or excessive friction on the polymer cup 18. The hard coat anodized surface provides smooth and quiet operation when used with the curtain glide 11. In the process of producing the hard coat anodized metal track 12, the metal track 12 undergoes hard coat anodization to produce a protective coat on the metal track 12 that is resistant to corrosion, scratching, chipping and other degradation processes. Hard coat anodization of metals, such as the metal track 12, is known to a person of ordinary skill in the art. It is foreseeable that the hard coat anodized metal track 12 may include a layer or sealant that may further improve its durability and smoothness.

Figure 5:
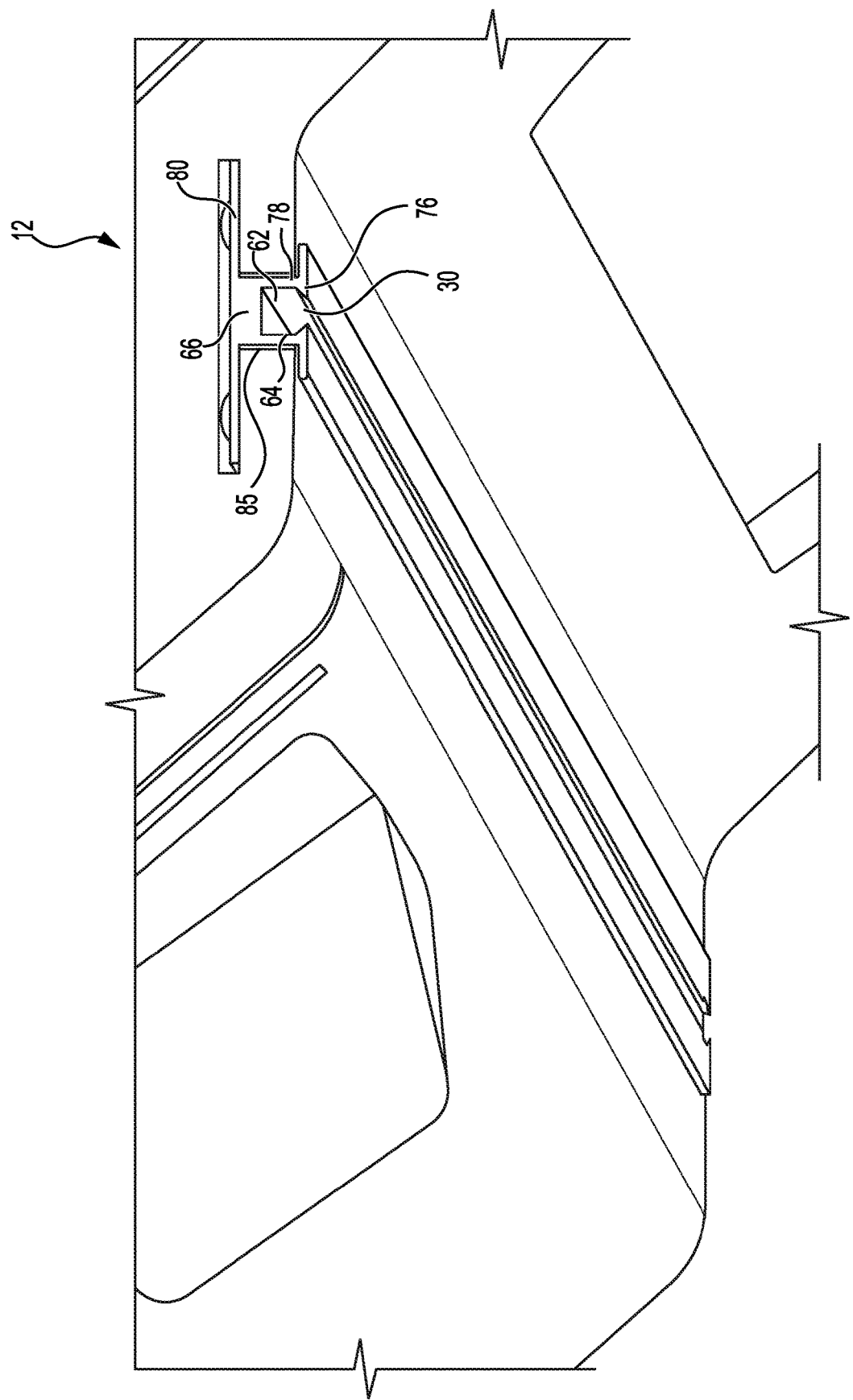
FIG. 5 is a perspective view of the metal track in FIG. 1, the curtain glide and the curtain removed from the metal track, in an embodiment.

As shown in FIGS. 1, 5, and 6, the metal track 12 is horizontally extending and may be installed overhead or on a ceiling. The metal track 12 may be formed by an extrusion process. The metal track 12 includes a longitudinally extending track bore 62 defined by two parallel side walls 64 and a top member 66. In an embodiment in which the metal track 12 is fastened to or installed on the ceiling, the top member 66 may be adjacent to and parallel to the ceiling. The two parallel side walls 64 are formed on and joined by the top member 66 extending therebetween, and in the embodiment shown the two parallel side walls 64 are perpendicular to the top member 66. Each side wall 64 has an inward extending flange 76 formed on a distal end 78 thereof, opposite the top member 66. The inward extending flanges 76 define the slot 30 formed therebetween, and the distance between the flanges 76 or the dimension of the slot 30 between the flanges 76 is less than the diameter of the metal core 13 but greater than the diameter of the cable 16. The track bore 62 extends the length of the metal track 12 and allows the polymer cup 18 fitted around the metal core 13 or metal-reinforced polymer cup 18 to slide within the metal track 12 with the swaged cable 16 projecting through the slot 30 defined by the flanges 76 of the two parallel side walls 64. In a preferred embodiment, the track bore 62 is just large enough for the metal core 13 to easily slide and rotate in the track bore 62. Reinforcement members 80 may extend outward on both sides of the top member 66, forming a single surface with the top member 66 for fastening the metal track 12 to the ceiling. In the embodiment shown in FIG. 5, the metal track 12 is formed to fit within a T-shaped notch or groove 85 in the ceiling such that the top member 66, the reinforcement members 80 and upper portions the side walls 64 slide within the notch and lower portions of the side walls 64 extend from the notch, including the flanges 76 with the slot 30 therebetween. As shown in FIGS. 1 and 5, the flanges 76 may also extend outward and perpendicular from the side walls 64 to brace or secure the metal track 12 in the groove 85 and to the bottom of the ceiling.

The metal-reinforced polymer cup 18 permits the curtain glide 11 to slide along the length of and rotate relative to the metal track 12 and stack compactly when the curtain 40 is moved to one side for stowing in a closed position. The compact size of the metal-reinforced polymer cup 18 permits the curtain glides 11 and the adjoined curtain 40 to stow in small or minimal spaces.

As forces are exerted on the curtain 40 by a user pulling or pushing the curtain 40 into a stowed "closed" position or into a deployed "open" position, each metal ball 13 with the fitted polymer cup 18 may slide along and/or rotate relative to the metal track 12 to reduce or minimize the forces necessary to be applied to the curtain 40 and curtain glides 11. Further, the polymer cup 18 reduces friction between the metal-reinforced polymer cup 18 on the metal track 12 and dampens vibrations and sounds from the movement of the curtain and curtain glides 11. Little effort is required by the user to move the curtain 40 and opening and closing the curtain 40 is a consistent and smooth operation. The ability of the metal ball 13 to rotate within the metal track 12, while presenting a consistent cross-section in every orientation relative to the metal track 12, results in a flexible, yet easy to use curtain gliding system 10.

The metal core 13 of the metal-reinforced curtain glide 11 remains functional in the event the polymer cup 18 fails. The metal core 13 may function as a backup or alternate glide portion that enables the curtain 40 to continue to function maintaining the user's ability to stow and deploy the curtain 40.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A curtain glide configured to be removably coupled to a curtain and to slide within a track having a longitudinally extending bore, the curtain glide comprising:
   a spherical metal core coupled to a linkage;
   a hemispherical polymer cup having an inner hemispherical concave surface formed to fit a base of the spherical metal core such that the spherical metal core nests inside and contacts the inner hemispherical concave surface, the polymer cup having an opening and the linkage extending therethrough; and
   an eyelet coupled to the linkage;
   wherein the curtain glide remains functional if the polymer cup fails.

2. The curtain glide of claim 1, wherein the linkage is a metal cable.

3. The curtain glide of claim 1, wherein the polymer cup is configured to provide a wear-resistant surface at a wear surface interface between the curtain glide and the track.

4. The curtain glide of claim 1, wherein the eyelet includes a circular member with a connecting member extending therefrom, the connecting member coupled to an end of the linkage.

5. The curtain glide of claim 1, further comprising a fastener coupled to the eyelet.

6. The curtain glide of claim 5, wherein the fastener is a first member of a fastener assembly configured to be removably secured to a second member of the fastener assembly that is coupled to a curtain.

7. The curtain glide of claim 6, wherein the first member of the fastener assembly includes a protrusion that removably interlocks with the second member.

8. A curtain glide configured to be removably coupled to a curtain and to slide within a track having a longitudinally extending bore, the curtain glide comprising:
   a spherical metal core coupled to a cable;
   a hemispherical polymer cup having an inner hemispherical concave surface formed to fit a base of the spherical metal core such that the spherical metal core nests inside and contacts the inner hemispherical concave surface, the polymer cup having a central opening and the cable extending therethrough;
   an eyelet having a circular member with a connecting member extending therefrom,
   wherein the connecting member is coupled to an end of the cable; and
   a first member of a fastener assembly coupled to the eyelet, wherein the first member is configured to be removably secured to a second member of the fastener assembly that is coupled to a curtain,
   wherein the curtain glide remains functional if the polymer cup fails.

9. The curtain glide of claim 8, wherein the polymer cup is configured to provide a wear-resistant surface at a wear surface interface between the curtain glide and the track.

10. The curtain glide of claim 8, wherein the fastener assembly is a snap assembly having the first member coupled to the eyelet, the first member configured to be removably secured to the second member of the fastener assembly that is coupled to the curtain.

11. A metal curtain gliding system configured to be removably coupled to a curtain, comprising:
    a track having a longitudinally extending bore defined by two parallel walls, each wall having an inward extending flange defining a slot therebetween; and
    a plurality of curtain glides configured to slide within the longitudinally extending bore,
    each curtain glide comprising:
       a spherical metal core coupled to a linkage;
       a hemispherical polymer cup having an inner hemispherical concave surface formed to fit abase of the spherical metal core such that the spherical metal core nests inside and contacts the inner hemispherical concave surface, the polymer cup having a central opening and the linkage extending therethrough, a dimension of the slot between the inward extending flanges being less than a diameter of each of the spherical metal core and the polymer cup, wherein the curtain glide remains functional if the polymer cup fails;
       the linkage extending from the polymer cup, the linkage configured to project through the slot in the track when the polymer cup slides within the longitudinally extending bore and the dimension of the slot between the inward extending flanges being greater than a diameter of the linkage; and
       an eyelet secured to an end of the linkage.

12. The metal curtain gliding system of claim 11, wherein the track is a hard coat anodized metal track.

13. The metal curtain gliding system of claim 11, wherein the polymer cup is configured to provide a wear-resistant surface at a wear surface interface between the curtain glide and the track during operation of the curtain gliding system.

14. The metal curtain gliding system of claim 13, wherein the polymer cup comprises a plastic polymer material formed by a selective laser sintering process.

15. The metal curtain gliding system of claim 11, wherein the eyelet includes a circular member with a connecting member extending therefrom, the connecting member coupled to an end of the linkage.

16. The metal curtain gliding system of claim 11, further comprising a fastener secured to the eyelet configured for removably coupling the curtain glide to the curtain.

17. The metal curtain gliding system of claim 16, wherein the fastener is a first member of a fastener assembly that is configured to be removably coupled to a second member of the fastener assembly that is joined to the curtain.

18. The metal curtain gliding system of claim 11, wherein each curtain glide is configured to rotate independently within the track about the respective linkage.

* * * * *